(12) United States Patent
MacChesney et al.

(10) Patent No.: US 7,874,180 B2
(45) Date of Patent: Jan. 25, 2011

(54) CHEMICAL POWDER DEPOSITION METHOD FOR THE MANUFACTURE OF OPTICAL FIBER PREFORMS AND OPTICAL FIBERS

(75) Inventors: John Burnette MacChesney, Lebanon, NJ (US); Thomas Edward Stockert, Millburn, NJ (US); Patrick William Wisk, Greenbrook, NJ (US); Man Fei Yan, Berkeley Heights, NJ (US)

(73) Assignee: OFS-Fitel L, Norcross, GA (US)

( * ) Notice: Subject to any disclaimer, the term of this patent is extended or adjusted under 35 U.S.C. 154(b) by 494 days.

(21) Appl. No.: 11/975,882

(22) Filed: Oct. 22, 2007

(65) Prior Publication Data

US 2008/0041111 A1 Feb. 21, 2008

Related U.S. Application Data

(63) Continuation of application No. 10/440,208, filed on May 15, 2003, now abandoned.

(51) Int. Cl.
*C03C 25/16* (2006.01)
(52) U.S. Cl. ....................................................... 65/430
(58) Field of Classification Search .................... 65/430, 65/444, 60.1
See application file for complete search history.

(56) References Cited

U.S. PATENT DOCUMENTS 2,833,665 A * 5/1958 Drexel et al. ................ 106/490
4,443,239 A * 4/1984 Biswas et al. ................. 65/395
4,610,708 A * 9/1986 Sarhangi et al. .............. 65/388
5,332,597 A * 7/1994 Carolan et al. .............. 427/243
6,207,337 B1 * 3/2001 Swain ......................... 430/127
2003/0182970 A1 * 10/2003 Sen et al. ....................... 65/390

FOREIGN PATENT DOCUMENTS

EP     158601 A1 * 10/1985

* cited by examiner

*Primary Examiner*—Queenie Dehghan
(74) *Attorney, Agent, or Firm*—Peter V. D. Wilde

(57) ABSTRACT

The specification describes the production of optical fibers and optical fiber preforms using Chemical Powder Deposition (CPD). In this process a slurry of silica powders and dopant powders in a liquid carrier is prepared and the inside surface of a silica glass starter tube is coated with the slurry, then dried. The coating is then consolidated and the tube collapsed as in the conventional MCVD process. Multiple coatings, and coatings with varying compositions, can be used to produce any desired profile. In an alternative embodiment, doped silica glass of the desired final composition is prepared, and then pulverized to form the powder for the slurry. In both embodiments, the use of powders of known composition in the slurry allows direct control over the final glass composition, as compared with conventional processes in which the composition in the final glass is indirectly controlled by control of the thermodynamics of a vapor phase reaction.

20 Claims, 3 Drawing Sheets

CHEMICAL POWDER DEPOSITION METHOD FOR THE MANUFACTURE OF OPTICAL FIBER PREFORMS AND OPTICAL FIBERS

RELATED APPLICATION

This application is a continuation of application Ser. No. 10/440,208, filed May 15, 2003 now abandoned.

FIELD OF THE INVENTION

This invention relates to methods for the manufacture of optical fibers, and to methods for preparing optical fiber preforms in preparation for optical fiber drawing.

BACKGROUND OF THE INVENTION

A wide variety of processes have been developed for making ultra-high purity glass optical fibers for lightwave transmission systems. In most of these processes, an optical fiber preform is prepared first, and optical fiber is drawn from the preform by heating the preform to a softened state, then pulling a fine strand of glass from the preform. The processes for making the preform rely in general on techniques for preparing very pure glass bodies using vapor phase chemical reactions. Among the most notable are Modified Chemical Vapor Deposition (MCVD), Vapor Axial Deposition (VAD), and Outside Vapor Deposition (OVD). A large number of variants of these basic approaches are known. In all of these, the glass preform body is made by depositing glass soot on a substrate. The soot is formed by an in situ reaction of gaseous glass precursors near or at the substrate. The result is that the deposited glass material has a purity close to that of the precursor materials. As is well-known, the soot—a powdery material—is consolidated into solid glass by sintering the powder particles and coalescing them into solid glass bodies or preforms, which can then be drawn into long lengths of optical fibers.

A limitation of these techniques is that the glass compositions for the preform are limited to constituents that can be conveniently provided in vapor form, and can be reacted with a silica precursor vapor to form doped glass. Another limitation of these techniques is that both the composition and particle size of the soot are indirectly controlled. The composition of the soot is controlled mainly by the flow of precursor gases to the soot torch, and the particle size is determined by several variables including the temperature of the torch. Both of these parameters are subject to process variations. While the thermodynamics of the MCVD process is well understood, and the control means on commercial MCVD apparatus are relatively sophisticated, in principle, the final glass composition is still controlled only indirectly, thus being subject to process variation. Moreover, while a variety of common dopant precursors are available in liquid form, with a reasonably high vapor pressure that allows for vapor phase processing, many potential dopants are not. Common dopants such as $GeO_2$, $B_2O_3$, and $P_2O_5$, form halides (e.g. $GeCl_4$, $POCl_3$, $BCl_3$) that are well adapted for vapor phase reactions. However, other potentially attractive and useful dopant elements do not form compounds as easily suited for vapor phase processing. Among these are the rare earth elements, notably, Er, Nd, Yb, Sm, La, Ce, Pr, Pm, Gd, Tb, Dy, Ho, Tm, Lu; Group IIIA elements such as Al and Ga; alkali elements such as Li, Rb, Na, K, Cs; transition group elements such as Cr, Fe, Ni, Zn; alkaline earth elements such as Ca, Ba, Sr; Group IVA elements such as Sn and Pb; and Group VA elements such as As, Sb, and Bi. Thus it is evident that there exists a large number of potential glass compositions that are not well adapted to the known vapor phase methods for glass preform manufacture.

Solution doping techniques are also known, and were developed in part to allow these alternative dopants to be incorporated into preform designs. In the typical solution doping methods, a glass soot is first prepared by one of the known vapor phase reaction techniques (e.g., MCVD, VAD) and the soot is soaked in a liquid solution containing a compound of the selected dopant. There are drawbacks to this approach also. A solvent must be found in which the dopant compound is soluble, and moreover which is benign to the final glass product. In addition, the amount of dopant incorporated into the final product is highly sensitive to the nature of the soot, i.e. the particle size, density, porosity, uniformity, and other microstructural features of the soot layer.

Applying particle mixtures directly to the glass surface in the form of a powder slurry has also been suggested. See PCT 01/53223 A1. However, this approach appears not to have been successfully tried, and the technology remains focused on vapor phase pyrolytic methods.

STATEMENT OF THE INVENTION

We have developed a process called Chemical Powder Deposition (CPD) in which glass powder is deposited directly on a high purity, high silica glass susbtrate, dried, and consolidated. The composition of the deposited glass is precisely controlled, and the constituents may comprise any glass forming elements and/or compounds.

In the CPD process, the chemical powder is provided as a liquid slurry, i.e. the glass forming material is suspended in a liquid carrier, the slurry applied to the substrate. Contrary to expectation, the slurry forms an adherent coating on the substrate. The coated substrate is dried, and the dried coating fired into a glass.

In the preferred embodiment, the chemical powder is coated on the interior of a glass starter tube, thus resembling MCVD. However, other known preform manufacturing methods, for example, OVD, and VAD, may be emulated using this approach, the main difference being the nature of the substrate coated with the chemical powder. The CPD process of the invention may be used in combination with other preform fabricating methods to form the various preform regions of the index profile and overclad regions as appropriate.

The preferred liquid carrier in the CPD process is a simple alkyl alcohol, preferably butanol. The powder species of interest are insoluble in this carrier, and moreover, it has been found that this carrier produces enhanced coatings as will be discussed in more detail below.

According to the invention, there are at least two suitable general approaches that may be used to form the slurry. In both cases the composition of the glass precursor material is uniform and precisely fixed. In one case dopant powder(s) are mixed with silica powder and the slurry made with the mixed powders. In another case, all of the glass ingredients are mixed and a vitreous glass body is prepared using standard glass making procedures. The doped glass body is then pulverized to form a powder with precisely the composition desired. In this case the final composition of the glass in the preform is completely independent of the processing used to make the preform. The CPD process also allows precise and direct control of the particle size. Prior to forming the slurry, the powders used may be classified by known techniques to reach precisely the size range desired.

As mentioned, the CPD process allows a wide selection of dopant materials, including the rare earth elements, notably, Er, Nd, Yb, and Sm; Group IIIA elements such as Al and Ga; alkali elements such as Na, K, Cs; transition group elements such as Cr, Fe, Ni, Zn; alkaline earth elements such as Ca, Ba, Sr; Group IVA elements such as Sn and Pb; and Group VA elements such as As, Sb, and Bi.

In the preferred embodiments, multiple coating steps are used to build a relatively thick vitreous layer. This is preferably implemented using one or more slurry powder deposition steps, and drying steps, alternating with at least partial consolidation steps.

DETAILED DESCRIPTION

As mentioned above, the CPD process can be applied to analogs of a variety of known methods for preform manufacture. For the purpose of this description, the process sequence is a modification of the MCVD process wherein glass precursor material is deposited on the inside of a starter tube to form a coating of doped glass, and the tube collapsed to form a solid glass preform. The optical fiber is then drawn from the solid glass preform. These procedures are well known in the art and need no detailed exposition here. For those details, see U.S. Pat. Nos. 4,191,545, and 4,257,797, which are incorporated by reference herein. A major distinction in the CPD process is the method used to form the coating on the inside walls of the starter tube prior to collapse.

Figure 1:
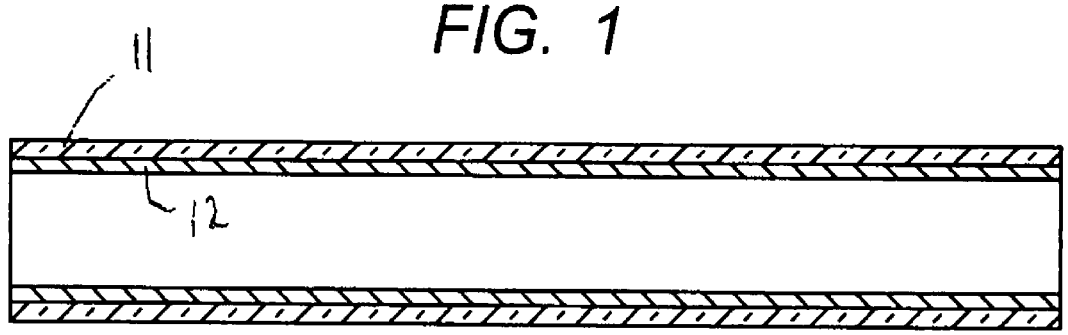
FIG. 1 is a schematic representation of a silica glass starter tube showing the initial coating operation in the CPD process.

Referring to FIG. 1, a silica glass tube 11 is shown with a CPD coating 12 on the inside surface of the tube. The tube is a standard starting tube of high purity silica glass as known and used in the industry for the MCVD process. The tube is typically pure silica, but may be doped silica for certain applications. The tube dimensions may vary substantially depending on the type of preform being prepared.

The coating material in the CPD process comprises glass powder in a carrier liquid. In one embodiment of the invention, solid compounds of the precursor materials, typically oxides, are thoroughly mixed together either in a dry state, or are mixed with the carrier liquid in slurry form. Either technique, or a combination of both techniques, is effective as long as the mixing is thorough. The slurry is then applied to the inside surface of the starter tube 11 to form coating 12. In an alternative embodiment, the desired ingredients are mixed as dry powders and heated to form a glass. The composition of the glass, and/or the optical properties of the glass, may then be measured to assure the desired properties. The selected glass is then pulverized, by ball milling or other suitable method, to produce a powder with precisely the properties desired. The powder is then used to form the slurry. An advantage of this embodiment of the CPD process is that the glass material that forms the coating undergoes no substantial chemical reaction in the process.

In either of the process embodiments just described, it may be desirable to classify the particle size of the powders used. This may be done by any of several known techniques for classifying fine powders, e.g. by gravity separation, centrifuging, or flowing gas methods. The preferred particle range for the powder(s) forming the slurry is 0.2-20 microns in diameter, and preferably 0.5-5 microns.

The thickness of the initial coating in the CPD process will vary with several factors, including the viscosity of the slurry. The slurry viscosity is dependent on factors such as particle size, density, concentration, and also on the dynamics of the carrier fluid, such as composition and temperature. The coating may be made using a single coating step, or by multiple coating steps as will be explained below. In general, the properties of the slurry will determine the initial coating thickness. However, some process control can be applied to enhance the initial coating thickness, and the wetting and sticking of the slurry with respect to the tube surface. Volatile organic surfactants may promote uniform coating. The viscosity of the slurry can be modified by heating or cooling the slurry, and/or the surface being coated. Flowing nitrogen may be used to control the temperature of the coating operation, i.e. to pre-cool the tube walls and maintain a reduced temperature, if desired.

The next step in the CPD process is to dry the coating. This may take from 10 minutes to 5 or more hours. Drying may be accelerated by moderate heating of the tube. Flowing warm (25-50° C.) nitrogen, or other inert gas, through the slurry-coated tube is recommended during at least part, and preferably the latter part, of the drying cycle.

After drying, the tube may be coated again by repeating the procedure just described. If desired, several or many coating/drying cycles may be used to develop a thick coating.

Figure 2:
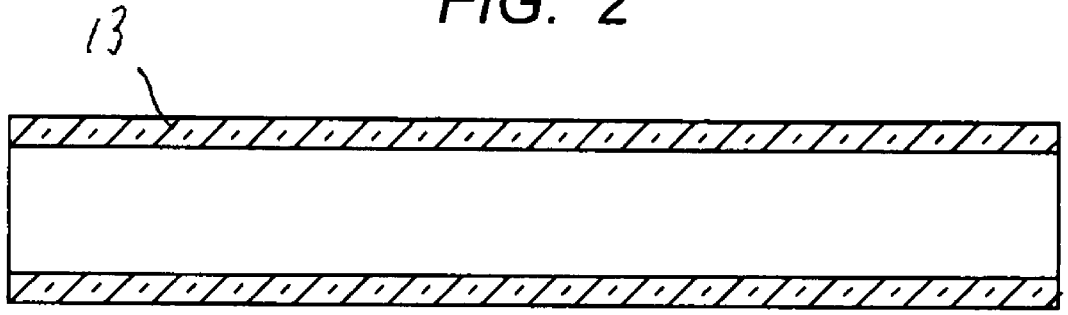
FIG. 2 shows the glass starter tube of FIG. 1 after consolidation.

The coated tube is then fired at a temperature in excess of 1800° C. to vitrify the dried slurry and fuse the glass particles in the dried slurry with each other and with the glass tube wall. This step is often referred to as a consolidation step, and is represented in FIG. 2, where the final glass layer is shown at 13. The thickness of this layer will be less than the thickness of layer 12 in FIG. 1. Consolidation of dried slurry layers may occur at any stage in the process. Thus, several coating/drying cycles may be performed, followed by consolidation. Then several more coating/drying cycles may be performed, followed by a final consolidation, and then collapse. The CPD process offers the ability to profile the refractive index of the finished preform by changing the composition of the slurry between one or more coating/drying cycles. This resembles the MCVD process whereby composition changes in sequential layers of soot are obtained by modifying flow rates (composition) of gases after one or more passes.

Figure 3:
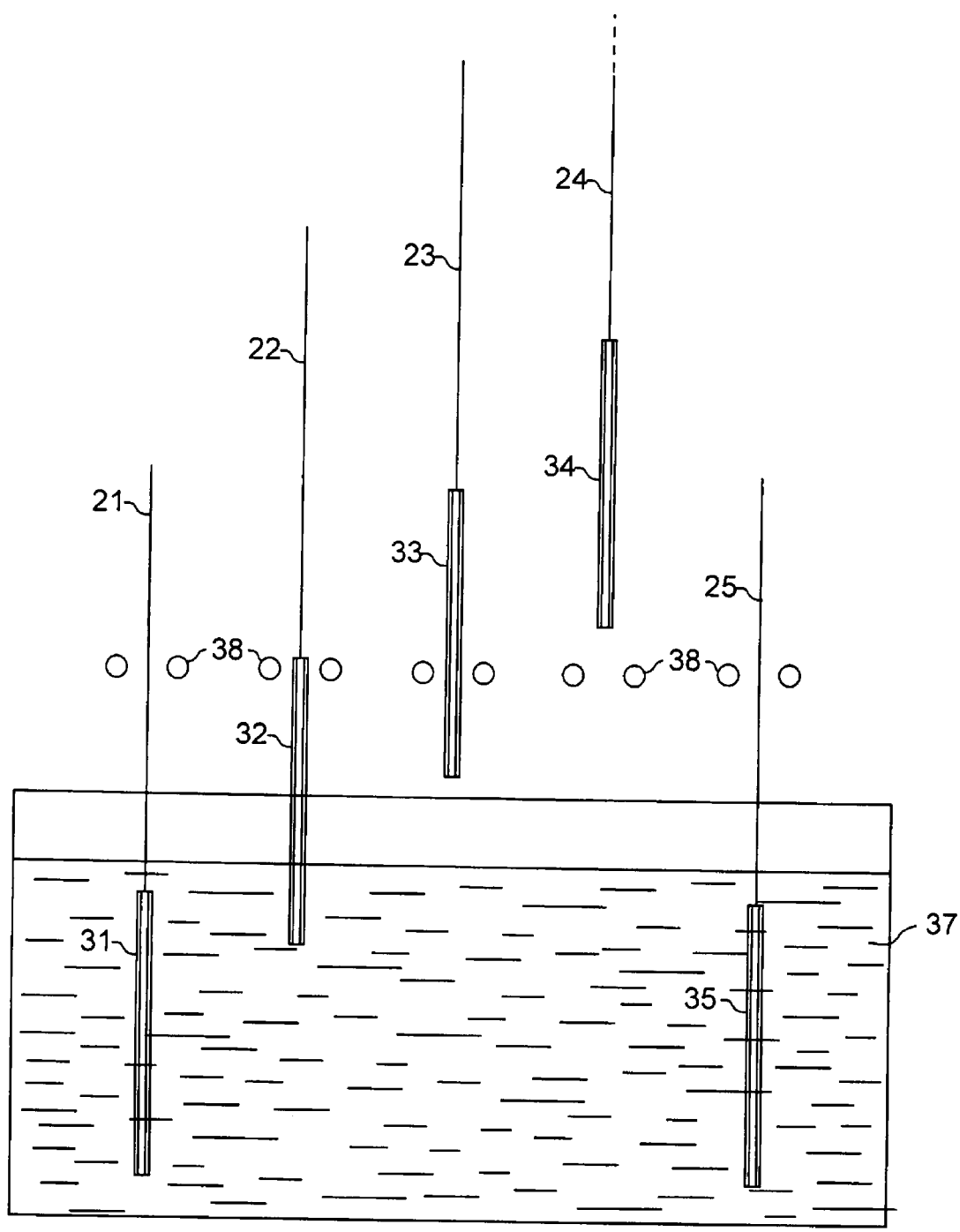
FIG. 3 is a schematic diagram of an apparatus suitable for producing the coatings described by FIG. 1.

Obtaining uniform slurry coatings on the inside surface of a tube has two main aspects. One is maintaining thickness uniformity around the periphery or circumference of the tube. The other is maintaining thickness uniformity in the direction longitudinal of the tube. Both of these are gravity effects, and depend largely on the orientation of the tube during processing. Thickness uniformity around the periphery or circumference of the tube is a major concern if the tube is mounted horizontally during processing. One way to address this is to rotate the tube during coating and drying. Ten to fifty rotations per minute is recommended. Longitudinal uniformity would appear to be a problem if the tube is mounted vertically during processing. However, if the slurry uniformly wets the tube walls, surface tension and other fluid dynamics will produce a relatively uniform coating thickness over most of the tube length. This is especially the case if an immersion technique is used. This is described schematically in FIG. 3, where tubes 31-35 are pulled vertically from slurry bath 37 using support rods 21-25. The tubes represent different stages in the coating/drying procedure. The tubes may be pulled slowly to allow the thickness of the slurry coating in the vertical direction (longitudinal to the tube length) to reach equilibrium. They are then passed through a moderate heating stage, as described earlier, and which in FIG. 3 is represented by ring elements 38. As long as the pull rate is uniform, the factors affecting the coating thickness will be precisely uniform along the tube length. In FIG. 3, tube 31 is shown fully immersed in the slurry. Tube 32 is nearly withdrawn from the slurry, with the top end of the tube entering the heating stage. Tube 34 is through the heating stage with drying complete. Tube 35 has been returned to the slurry bath to repeat the procedure. The coating on the outside of the tube is superfluous from a functional (light guiding) standpoint, but may be removed if desired. Also, it may be prevented by mounting the glass tube within another tube, with concentric plugs used to seal the space between the tubes.

An important feature of the CPD process is the ability to change the composition of the slurry for sequential coating/drying cycles, or between sets of coating/drying cycles. This simply involves changing the bath 37 in FIG. 3 for subsequent passes, or groups of passes.

We have found it advantageous to at least partially consolidate the deposited powder between slurry deposition and drying steps. The function of the consolidation step is to densify the deposit so that, upon subsequent immersions, absorption of the carrier liquid by previously deposited layers is reduced. It also increases the integrity of the deposited powder layer and reduces the likelihood of flaking. If deposited powder layers become too thick, without intermittent consolidation, the tendency for forming cracks is increased. It is not essential to completely consolidate the deposit, i.e. to form fully vitreous and fully dense glass. Partial consolidation is sufficient. Accordingly, it should be understood that the term consolidation as herein is intended to include and intended to define a step that uses at least partial consolidation. Depending on the composition of the slurry, partial consolidation means that the powder layer is densified such that most pores still remain open to the layer surfaces. In a typical case, this will produce a body having at least 50% of the density of the body in the fully dense vitreous state.

Consolidation may be performed between each slurry deposit/dry step combination, or between sets of slurry deposit/dry step combinations. In preferred embodiments, one or more deposit/dry step combinations are performed using one powder composition, and consolidation is performed when the composition of the slurry is changed.

As mentioned above, the preferred slurry liquid is an alkyl alcohol. It was discovered that the use of butanol as the slurry liquid results in unexpected attraction between the slurry particles and the tube wall. Thus the thickness of layers produced using a slurry of glass powder and butanol is enhanced. However, similar results may be found with other alcohols. Also, other fluids, i.e. other than alkyl alcohols, may be found effective. An advantage of using an organic slurry liquid is that some glass precursor compounds, such as some of the nitrates or halides of the elements mentioned earlier, or phosphate, borate, or alkali species, which may be soluble in other liquids, are essentially insoluble in organic liquids, i.e. have a solubility of less than 1% by weight. This aspect is important in the embodiment of the invention where powder compounds of the preform dopants are mixed to form the slurry. It is not of consequence in the embodiment where the final silicate glass composition is prepared first (for which insolubility in the carrier fluid may be taken as a given). In the former embodiment just mentioned, the CPD process takes advantage of the insolubility of the preform dopants in the slurry medium.

We have found that unexpectedly thick layers of dried powder, with relatively good adhesion to the substrate glass, result when the slurry is made with relatively large particles, e.g. average diameter=0.5-5 microns, the carrier medium is a higher order alkyl alcohol (MW=60 or more). This combination has been found to produce layers with a thickness of more than 50 microns, and in many cases more than 100 microns, in a single pass. It is also beneficial, from the standpoint of obtaining thick coatings, to use a slurry loading of more than 25% by weight, typically 25-50% by weight, of solid particulates.

In contrast to conventional wisdom, the inventive technique forms slurries of large and disparate size particles. These, unlike sols that form gels, result in deposits with densities approaching those of close packing. Upon drying, reduced shrinkage results in a decreased tendency to crack of flake. Still we find it advantageous to at least partially consolidate the deposited powder between slurry deposition and drying steps. The function of the consolidation step is to produce chemical bonding between particles of the deposit so that, upon subsequent immersions, absorption of the carrier liquid does not cause impairment or disintegration of previously deposited layers. It also increases the integrity of the deposited powder layer and reduces the likelihood of flaking. If deposited powder layers become too thick, without intermittent consolidation, the tendency for forming cracks is increased, as with conventional gel layers of thickness only a few microns or less.

Consolidation may be performed between each slurry deposit/dry step combination, or between sets of slurry deposit/dry step combinations. In preferred embodiments, one or more deposit/dry step combinations are performed using one powder composition, and consolidation is performed when the composition of the slurry is changed.

Practice of the invention is represented by the following example.

EXAMPLE

A chemical powder slurry is prepared by mixing glass powders in butanol. The powders comprise silica powder or Pyrex glass powder and the dopant elements. The percent by weight of solids in the slurry is 28-32%. Dopant elements in this example can be chosen from $Er_2O_3$, $Er(NO_3)_2$, $Al_2O_3$, $Al(NO_3)_3$. Mixtures of Er and Al are typically effective since the Al dopant aids in solubilizing the rare earth in the glass. For a discussion of Al dopants in optical fibers see U.S. Pat. No. 4,616,901, which is incorporated by reference herein.

The glass powders and dopant precursors are mixed in butanol using either a magnetic stirrer or by a ball milling technique. In the ball milling technique the silica powder, dopant precursor(s) and butanol are mixed using a high-purity silica milling media, e.g. silica balls of about 5-15 mm diameter placed in a container that is rotated or vibrated in a manner that causes effective mixing and grinding action.

The resulting glass powder slurry is coated on inside of a cylindrical glass tube. Suitable tubes are silica-based, Vycor-based, or Pyrex-based, e.g. un-doped silica tubes designated F300, and fluorine-doped F320 tubes, both available from Heraeus, boron-doped silica tubes, Vycor tubes available from Corning. As is well known, all of these are solid glass tubes. The coating may then be dried at room temperature, or at a slightly to moderately elevated temperature. A recommended range is 20-80° C. A useful procedure is to partially dry the coating at room temperature, then flow warm (25-50° C.) $N_2$ though the tube. During the coating operation, and also during the initial drying operation, it is desirable, for coating thickness uniformity, to rotate the tube at 10-50 rotations per minute. A typical coating thickness is in the range 25-300 microns.

The coating and drying steps may be repeated to obtain thicker deposits. The dopant and dopant concentration in the slurry can be varied as these steps are repeated.

The tube with the dried deposit is mounted in a rotating glass lathe and consolidated by heating to a temperature of 1900-2100° C., using a conventional oxy-hydrogen torch with a traverse rate of 8-12 cm/min. It is desirable to maintain a high temperature during consolidation so that the particulates in the dried coating are vitrified without significant exposure to intermediate temperatures at which a crystalline phase, i.e. the cristobalite phase, nucleates.

If the dried layer is to be a down-doped layer, a fluorine gas, such as silicon tetrafluoride ($SiF_4$) or sulfur hexafluoride ($SF_6$), or a Freon such as $CF_4$ or $C_2F_6$, may be introduced into the tube during drying and consolidation. The same expedient may be effective if the dopant already in the deposited glass layer is boron, to counteract dopant losses during processing.

As mentioned earlier, it will be desirable in some cases to use consolidation steps between one or more coating/drying steps.

After the final consolidation step, the tube is collapsed by conventional MCVD techniques to form a solid preform. See e.g. J. B. MacChesney and D. J. DiGiovanni, "Materials Development of Optical Fiber", J. Am. Ceram. Soc., 73 [12] 3537-3556 (1990).

Figure 4:
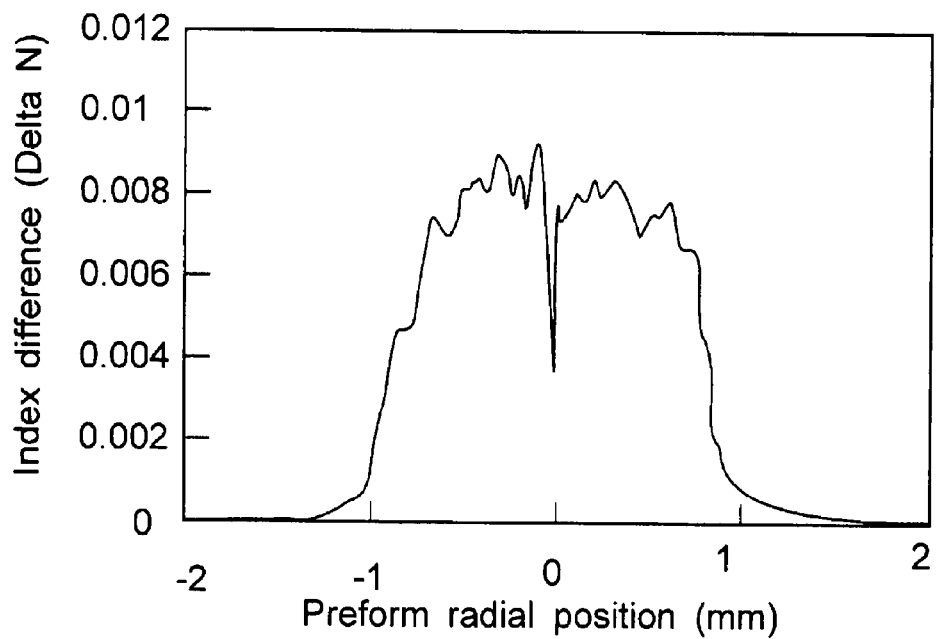
FIG. 4 is a refractive index profile for a preform made according to the invention.

FIG. 4 shows a refractive index profile for the resulting preform. Optical fibers produced from this preform will have the same qualitative index profile.

As mentioned earlier, there are several potentially important applications for the invention. It may be used as in an MCVD process to form an entire preform. Alternatively, it may be used to form just the core rod for a rod-in-tube preform manufacturing method, with the cladding tube added later. The main difference between this process and that described above is that the starting substrate is a solid rod instead of a hollow tube. Or, in another related embodiment, it may be used to form the cladding tube for a rod-in-tube process. In this case, the starting tube may be vitreous, or may be partially consolidated soot.

In these cases, the method of forming the glass particulate layer on the substrate surface is a main aspect of the invention. Once the desired layer is produced, any conventional technique for collapsing the tube, or finally consolidating the rod may be used. The last consolidation step may be combined with the collapse step, or the draw operation. The latter is especially useful when the substrate is a rod, meaning that there is no collapse step and the process proceeds to the draw operation without a collapse step.

In the embodiment wherein the invention is applied to the production of cladding tubes, alkali dopants are especially effective. These dopants, namely, Cs, Rb, Na, K, and Li, are believed to improve the optical transmission properties of the core of the optical fiber. However, in conventional processes, two drawbacks exist that limit the usefulness of these dopants. First, ions of these dopants are small, and they diffuse readily under the conditions used in conventional preform manufacture. Second, the salts of these ions are highly hygroscopic, and the contamination of optical fiber cores with water is known to cause optical loss. However, both of these drawbacks are reduced or eliminated when alkali salts are used in the process of the invention. This is especially the case when alkali ions are used as dopants in a cladding tube. Upon collapse of the cladding tube around the core rod, the fast diffusing alkali dopants diffuse to the core, where they are effective in reducing optical loss.

In all of the embodiments of the invention the substrate is a high silica glass. This is defined as a glass having a composition of more than 85% silica by weight.

Figure 5:
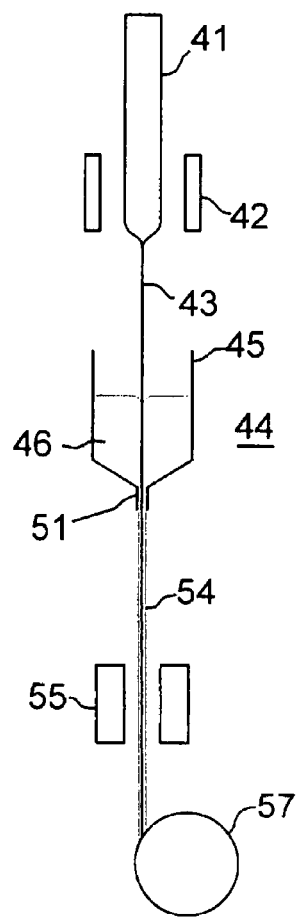
FIG. 5 is a schematic representation of an optical fiber drawing apparatus.

After preparation of the preform, the optical fiber is drawn from the preform using an apparatus similar to that shown in FIG. 5. FIG. 5 shows an optical fiber drawing apparatus with preform 41, and susceptor 42 representing the furnace (not shown) used to soften the glass preform and initiate fiber draw. The drawn fiber is shown at 43. The nascent fiber surface is then passed through a coating cup, indicated generally at 44, which has chamber 45 containing a coating prepolymer 46. The liquid coated fiber from the coating chamber exits through die 51. The combination of die 51 and the fluid dynamics of the prepolymer controls the coating thickness. The prepolymer coated fiber 54 is then exposed to UV lamps 55 to cure the prepolymer and complete the coating process. Other curing radiation may be used where appropriate. The fiber, with the coating cured, is then taken up by take-up reel 57. The take-up reel controls the draw speed of the fiber. Draw speeds in the range typically of 1-30 m/sec. can be used. It is important that the fiber be centered within the coating cup, and particularly within the exit die 91, to maintain concentricity of the fiber and coating. A commercial apparatus typically has pulleys that control the alignment of the fiber. Hydrodynamic pressure in the die itself aids in centering the fiber. A stepper motor, controlled by a micro-step indexer (not shown), controls the take-up reel.

Coating materials for optical fibers are typically urethanes, acrylates, or urethane-acrylates, with a UV photoinitiator added. The apparatus of FIG. 5 is shown with a single coating cup, but dual coating apparatus with dual coating cups are commonly used. In dual coated fibers, typical primary or inner coating materials are soft, low modulus materials such as silicone, hot melt wax, or any of a number of polymer materials having a relatively low modulus. The usual materials for the second or outer coating are high modulus polymers, typically urethanes or acrylics. In commercial practice both materials may be low and high modulus acrylates. The coating thickness typically ranges from 150-300 µm in diameter, with approximately 245 µm standard.

Various modifications of this invention will occur to those skilled in the art. All deviations from the specific teachings of this specification that basically rely on the principles and their equivalents through which the art has been advanced are properly considered within the scope of the invention as described and claimed.

The invention claimed is:
1. Method for the manufacture of optical fiber comprising:
 (a) preparing an optical fiber preform,
 (b) heating the preform to the softening temperature, and
 (c) drawing an optical fiber from the preform, the invention characterized in that the preform is prepared by steps comprising:
  (i) forming a slurry consisting essentially of glass powder comprising silica and a carrier liquid,
  (ii) applying the slurry to the inside of a solid vitreous glass tube by dipping the solid vitreous glass tube into the slurry thereby forming a coating on the inside of the solid vitreous glass tube,
  (iii) drying the slurry to remove the carrier liquid and form a first dried coating,
  (iv) at least partially consolidating the first dried coating.

2. The method of claim 1 including the additional steps of
(v) coating the consolidated coating with a slurry,
(vi) drying the slurry to form a second dried coating,
(vii) at least partially consolidating the second dried coating.

3. The method of claim 2 wherein steps (iii) and (vi.) are heating steps performed. at a temperature of at least 25° C.

4. The method of claim 3 wherein step (iii) is performed for a period in excess of 30 minutes.

5. The method of claim 2 wherein the slurry in step (v) comprises powder with a composition different than the powder in the slurry in step (ii).

6. The method of claim 1 wherein the slurry comprises greater than 25% by weight solids.

7. The method of claim 1 wherein the slurry is formed by mixing glass powders to form a mixed glass powder, then mixing the mixed glass powder with the carrier liquid.

8. The method of claim 1 wherein the slurry is formed by mixing glass powders while in the carrier liquid.

9. The method of claim 1 wherein the consolidation step (iv) produces a body with at least 50% of the density of the body in the fully dense vitreous state.

10. The method of claim 1 wherein the carrier liquid comprises an organic alcohol with a molecular weight of 60 or greater.

11. The method of claim 10 wherein the carrier liquid consists essentially of butanol.

12. The method of claim 1 wherein the glass powder comprises a mixture of powdered silica and one or more powdered dopant compounds.

13. The method of claim 12 wherein the one or more powdered dopant compounds are selected from the group consisting of oxides, nitrates, and sulfates.

14. The method of claim 12 wherein the one or more powdered dopant compounds are compounds of elements selected from the group consisting of La, Ce, Pr, Pm, Gd, Tb, Dy, Ho, Tm, Lu, Er, Nd, Yb, Sm, Al, Ga, Li, Rb, Na, K, Cs, Cr, Fe, Ni, Zn, Ca, Ba, Sr, Sn, Pb, As, Sb, and Bi.

15. The method of claim 1 wherein the glass powder comprises a powder of doped silica particles.

16. The method of claim 1 wherein the drying step (iii) includes flowing nitrogen through the tube.

17. The method of claim 1 wherein step (iv) is carried out by heating the solid vitreous glass tube to a temperature above 1900° C.

18. Method for the manufacture of optical fiber comprising:
(a) preparing an optical fiber preform,
(b) heating the preform to the softening temperature, and
(c) drawing an optical fiber from the preform, the invention characterized in that the preform is prepared by steps comprising:
(i) forming a first slurry consisting essentially of glass powder comprising silica and a carrier liquid,
(ii) coating a solid vitreous glass tube with a slurry coating, the coating step performed by:
(1) suspending the solid vitreous glass tube vertically from a support member,
(2) lowering the support member and the solid vitreous glass tube into a bath consisting essentially of the slurry,
(3) raising the support member and the solid vitreous glass tube from the bath, leaving a slurry coating on the solid vitreous glass tube,
(4) allowing the slurry coating thickness to reach equilibrium,
(iii) drying the slurry to remove the carrier liquid and form a dried coating,
(iv) heating the dried coating to form a vitreous glass layer.

19. The method of claim 18 wherein the tube is mounted within another tube with concentric plugs sealing the space between the tubes.

20. Method for the manufacture of an optical fiber preform comprising:
(a) forming a slurry consisting essentially of glass powder comprising silica and a carrier liquid,
(b) applying the slurry to the inside of a solid vitreous glass tube by dipping the solid vitreous glass tube into the slurry thereby forming a coating on the inside of the solid vitreous glass tube,
(c) drying the slurry to remove the carrier liquid and form a first dried coating,
(d) at least partially consolidating the first dried coating.

* * * * *